(No Model.) 2 Sheets—Sheet 1.
R. T. TORKELSON.
BICYCLE.
No. 426,402. Patented Apr. 22, 1890.
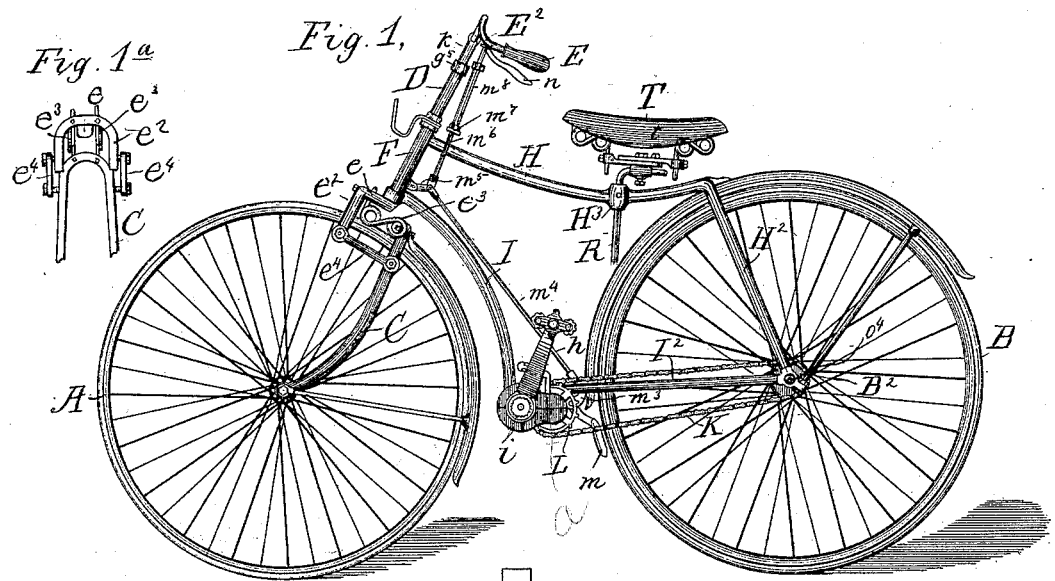
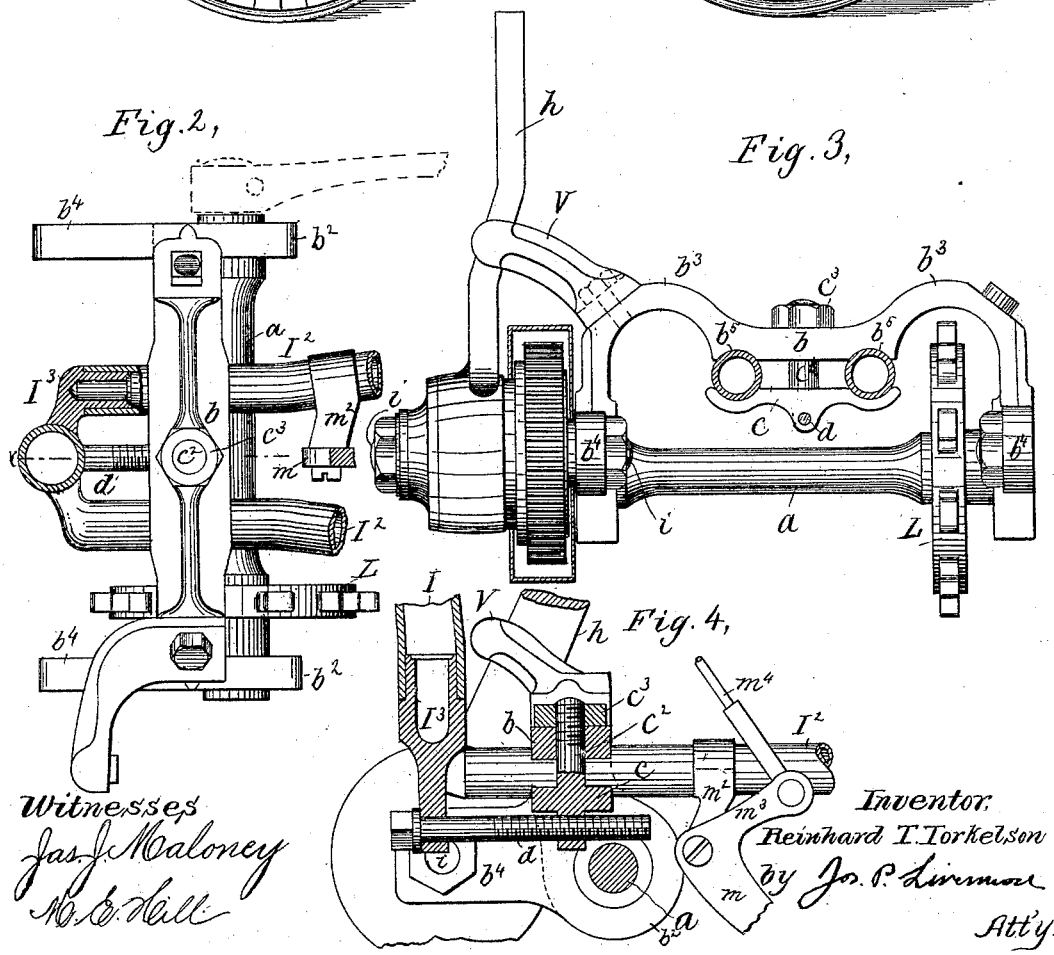
Witnesses
Jas. J. Maloney
M. E. Hall
Inventor
Reinhard T. Torkelson
by Jos. P. Livermore
Att'y (No Model.) 2 Sheets—Sheet 2.
R. T. TORKELSON.
BICYCLE.
No. 426,402. Patented Apr. 22, 1890.
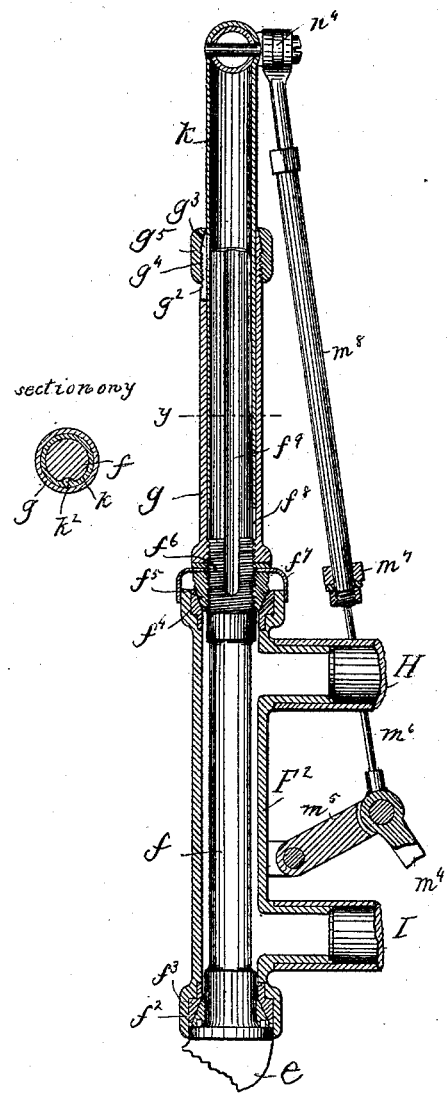
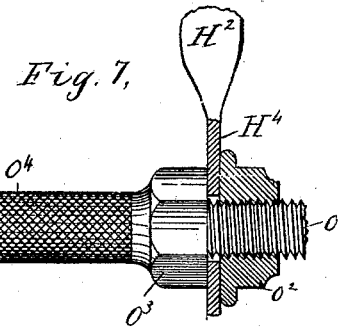
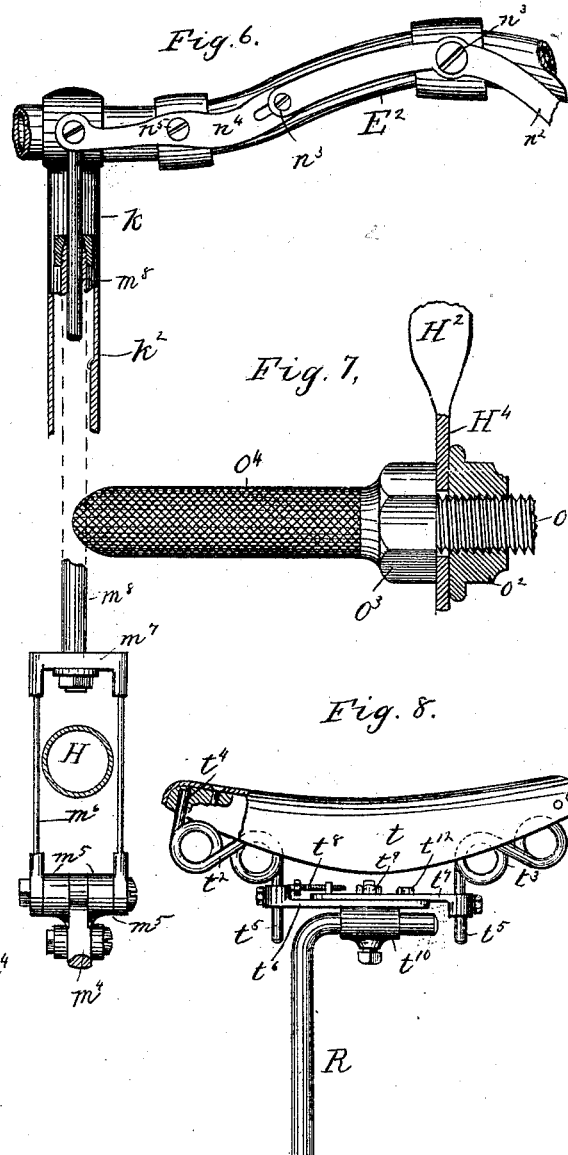
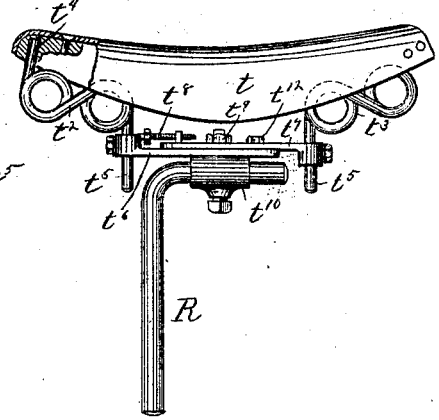
Witnesses
Jas. J. Maloney
M. E. Hill
Inventor,
Reinhard T. Torkelson
by Jos. P. Livermore
Att'y.

UNITED STATES PATENT OFFICE.

REINHARD T. TORKELSON, OF HATFIELD, ASSIGNOR, BY DIRECT AND MESNE ASSIGNMENTS, TO JOSEPH B. McCUNE AND JOSEPH L. YOST, BOTH OF EVERETT, MASSACHUSETTS.

BICYCLE.

SPECIFICATION forming part of Letters Patent No. 426,402, dated April 22, 1890.

Application filed June 18, 1889. Serial No. 314,700. (No model.)

*To all whom it may concern:*

Be it known that I, REINHARD T. TORKELSON, of Hatfield, county of Hampshire, and State of Massachusetts, have invented an Improvement in Bicycles, of which the following description, in connection with the accompanying drawings, is a specification, like letters on the drawings representing like parts.

My invention relates to a bicycle of the kind now commonly known as a "safety-bicycle," having two wheels of substantially small diameter connected by frame-work, the front wheel having its bearings in a fork that is pivotally connected with the frame-work extending to the bearings of the rear wheel, and the driving-power being applied to the rear wheel from pedals located at or near the front of the periphery of the rear wheel.

The present invention consists, mainly, in details of construction of the frame-work and means for actuating the working parts connected therewith, and relates especially to the construction of the fork supporting the bearings for the front wheel, to the pivotal connection between the said fork and frame-work extending to the rear wheel, to the saddle or seat-support for the rider, to the brake and means for actuating it, and to the means for supporting the shaft to which the power is directly applied and adjusting it with relation to the bearings of the rear wheel, with which the said shaft is connected by chain-and-sprocket gearing in the manner usually adopted in vehicles of this type, and also to the step or foot-rest employed by the rider in mounting the vehicle.

The main frame-work connecting the fork for the front wheel with the bearings for the rear wheel is of the kind commonly known as a "diamond frame," having two portions or members that meet at the hub of the rear wheel, one of said members extending downward from near the top of the fork and then backward to the hub of the rear wheel and supporting the driving-shaft near the junction of the downward and rearward portions, and the other of said members extending rearward from the part pivotally connected with the fork to a point above the periphery of the rear wheel and then downward to the hub of the rear wheel, the said rearward portion of the upper member of the frame supporting the seat or saddle, and both members being forked or made in two branches at their rearward part to receive the rear driving-wheel between them.

The vehicle is shown in this instance as actuated by a lever and clutch mechanism having substantially the principle of operation shown and described in Letters Patent No. 334,325, to Joseph L. Yost, dated January 12, 1886, reissued September 6, 1887, No. 10,864; but it is not essential to the present invention that such actuating mechanism should be employed, as all features of the present invention are equally applicable to bicycles in which the usual shaft provided with cranks and pedals having a continuous rotary movement is employed.

Figure 1 is a side elevation of a bicycle embodying this invention, and Fig. 1ª a detail thereof in front elevation, to be referred to; Fig. 2, a plan view of a portion thereof on a larger scale; Fig. 3, a sectional view showing the adjustable bracket or support on which the driving-shaft that stands at the front of the rear wheel is supported, in front elevation; Fig. 4, a longitudinal vertical sectional detail on line $x$, Fig. 3; Fig. 5, a longitudinal section of the steering-head or parts forming the joint between the fork supporting the bearings for the front wheel and the main frame-work extending therefrom to the rear wheel; Fig. 6, a detail showing a portion of the brake-actuating mechanism in front elevation; Fig. 7, a detail of the step used in mounting; and Fig. 8 a side elevation of the saddle.

The general construction of the bicycle represented in Fig. 1 will first be briefly described, after which the various novel features will be described more fully in connection with the detail views thereof.

The bicycle comprises a front steering-wheel A and rear driving-wheel B, the former having its bearings in a fork C, connected at its upper end with a post or upright D, provided with a handle-bar having steering-handles E, and pivotally connected at F with the main frame H H² I I², extending to and connected with the bearings of the rear wheel B, the hub of which is provided with a sprocket-wheel B², connected by a chain K with a sprocket-wheel L on a driving-shaft $a$, (see Figs. 2, 3, and 4,) connected with the lower portions I I² of the main frame, as will be hereinafter described.

The upper member H H² of the main frame is of substantially the same construction as usually adopted in this type of machine, the portion H being a single tubular beam provided with a socket H³ for receiving the post R, upon which the saddle or rider's seat T is supported, the rear part H² of the said frame being forked to extend down at each side of the rear wheel B to bearings at each end of the hub thereof.

The lower member I I² of the main frame is made with the portion I, a singular tubular piece curved to be substantially concentric with the wheel A, and rigidly connected at its lower end by a suitable forging or connecting piece I⁸ (see Figs. 2 and 4) with the portion I³ of the said frame, which consists of two tubes, forming a fork, that extend to and unite with the lower end of the fork H² at the bearings for the rear wheel. The said tubes I² converge toward one another as they advance from the hub of the wheel B to a point near the bracket I³, but for a short distance from said bracket are made substantially parallel, as shown in Fig. 2, the said portion affording a support for the bracket $b$, on which the bearings for the driving-shaft $a$ are mounted. The said shaft $a$, carrying the sprocket L, before referred to, is shown in this instance as actuated by pedal-levers $h$, (see Fig. 1,) having a vibrating movement and connected with said shaft by a ratchet-clutch and gearing having substantially the same principle of operation as shown in the said patent to Yost before referred to; but for an understanding of the present invention it is unnecessary to describe this connection in detail, it being understood merely that the driving-power is applied to the shaft $a$ more or less directly from pedals operated by the feet of the rider, and, if desired, the said shaft $a$ might be provided with cranks outside of its bearings in the bracket $b$, as shown in dotted lines at the top of Fig. 2, the said cranks having pedals operated by the feet with a rotary motion, as is well known in bicycles of this kind.

This part of the present invention relates especially to the construction of the bracket $b$, that supports the shaft $a$, and to the corresponding part I² of the frame and the means for connecting the said bracket with the said frame, one of the objects being to make the driving mechanism readily interchangeable, so that either the vibrating-lever action or the rotating-crank action may be adopted as preferred, it being necessary only to have brackets $b$ and shafts $a$ therein provided with either desired means for actuating the said shaft, either one of which may be substituted for the other without change in any other part of the machine. The said bracket $b$ is provided with projections $b^2$, that extend either above or below the frame-pieces I², as may be preferred, they being in this instance shown as extended below to afford bearings for the shaft $a$, which thus extends transversely to the frame-piece I² without interfering therewith. One side of the bracket $b$ is arched up, as shown at $b^3$, to make room for the sprocket-wheel L and the chain, and for symmetry the other side is also represented as arched up, and when the lever action is adopted the arched-up portions $b^3$ also receive upon them the stops V, that limit the backward vibrations of the levers $h$.

When the lever construction is adopted, the portions $b^2$ of the bracket are also extended forward, as shown at $b^4$, to form a support for the pin $i$, on which the lever $h$ vibrates; but when the crank construction is adopted such forward extension $b^4$ of the bracket is unnecessary and may be omitted, as represented in the dotted lines in the upper part of Fig. 2, which represents all that is necessary for the crank construction of the machine. (See also dotted lines, Fig. 4.) The said bracket $b$, that supports the bearings for the shaft $a$, is provided with recesses $b^5$, or otherwise shaped to seat upon the frame-pieces I², to which it is secured by a T-shaped clamp $c$, that bears upon the said frame-piece I², opposite to the bearing parts of the bracket $b$, and is provided with a bolt or stem $c^2$, extending up between the frame-piece I² and through a suitable opening in the bracket $b$, above which it is provided with a nut $c^3$, by which the bracket and clamp may be drawn tightly together and locked upon the said frame-piece.

By slackening the nut $c^3$ the bracket and its clamp may be moved longitudinally on the frame-piece I² to adjust its position with relation to the hub of the driving-wheel B, so as to bring the chain K to the proper tension. To facilitate this adjustment of the bracket on the frame, an adjusting-bolt $d$ extends from the bracket $b$ or from its clamp $c$ to the piece I³, that connects the parts I I² of the frame, (see Fig. 4,) so that by turning the said bolt when the nut $c^3$ is loosened the bracket may be moved along the frame-piece, and when brought to the proper position it is again clamped by tightening the nut $c^3$ so as to relieve the adjusting-bolt $d$ from strain. By this means for supporting and adjusting the shaft $a$ the adjustment may be quickly and easily made, and the said shaft is held very firmly in a position parallel with the hub of the wheel B, and the entire construction is very simple and inexpensive.

In order to diminish shocks or jars produced by unevenness of the road or surface on which the vehicle is traveling, the fork C is connected with the steering-post D by a yielding connection, making what is commonly called a "spring-fork," the specific construction of which yielding connection constitutes one of the features of this invention, being represented in Fig. 1 and in front elevation in Fig. 1$^a$. The steering-post D, or part connected directly with the handles E and pivotally connected with the frame extending to the rear wheel, is in accordance with this invention extended forward, as shown at $e$, Fig. 1, a short distance above the periphery of the front wheel A, and is then branched downward, making a short fork $e^2$ over the rim of the front wheel A. The upper ends of the branches of the fork C unite or bridge over the rim of the wheel A some distance at the rear of the fork $e^2$, and are connected by springs $e^3$—one at each side of the rim of the wheel—with the short fork $e^2$ or forward extension $e$ of the steering-post. The said springs are shown as made of stout wire, having a coil near each extremity, and thus yielding easily to accommodate the up and down motion of the upper end of the fork C with relation to the steering-post without appreciably yielding to strain upon said fork in any other direction, and to further steady the movement of the fork C with relation to the steering-head so that it can yield in a substantially vertical direction, only the lower ends of the short fork $e^2$ are connected with the sides of the fork C a short distance below its upper end by links $e^4$, thus preventing any considerable fore and aft motion of the lower part of the fork with relation to the steering-head. In other words, the springs $e^3$ practically constitute elastic links parallel with the links $e^4$, and the combined action of these parts $e^3$ $e^4$ causes the fork C to move up and down with a parallel motion—i. e., its different positions being substantially parallel to one another, while the connection is substantially rigid to prevent other movements of the fork C with relation to the steering-head.

The connection between the steering-head or upright that carries the handles E and the main frame extending to the rear of the machine is represented in Fig. 5, and is substantially independent of the specific construction of the two parts of the frame connected by it—that is, the invention, so far as relates to this connection or joint between these two parts of the frame, is not limited to the specific construction of the frame-pieces—i. e., C on one side and H H$^2$ I I$^2$ on the other side connected by it—but is equally applicable to a frame having a rigid fork or a spring-fork of any other construction than the one last described for the front wheel, and any suitable frame-work extending from said joint to the rear wheel. The said joint, as shown in Fig. 5, comprises a post or upright $f$, the lower end of which is connected directly or indirectly, as just described, with the fork for the front wheel, it being necessary only that such connection be so made that the front wheel will turn to vary the position of its plane of rotation for steering as the said post $f$ is turned. The said post $f$ supports near its lower end a bearing-piece $f^2$, (shown as cone-shaped,) and the frame-work H I, extending to the rear wheel, is rigidly connected with a tubular piece or sleeve F$^2$, fitting loosely over the said post $f$ and provided at its lower end with a bearing-piece $f^3$, resting upon and co-operating with the bearing-piece $f^2$ at the lower end of the post $f$. The sleeve F$^2$ is provided at its upper end with a similar bearing-piece $f^4$, co-operating with a corresponding bearing-piece $f^5$, adjustable on the post $f$, the said bearing-piece $f^5$ being threaded to turn on a threaded portion $f^6$ on the bearing-post.

The bearing-pieces $f^2$ $f^3$ and $f^4$ $f^5$ may have their bearing-surfaces made in any suitable or usual way, and with any suitable or usual form of anti-friction devices; but the cone-bearings shown are believed to be thoroughly efficient and most desirable.

A washer $f^7$ rests upon the upper end of the bearing-piece $f^5$, and has a downwardly-projecting flange to cover the joint, so as to prevent the access of dust to it.

The adjustment of the bearing-piece $f^5$ controls the pressure on both the upper and lower bearings and when properly adjusted is fastened by a tubular piece or sleeve $g$, the lower end of which is threaded to form a nut that screws upon the thread $f^6$ of the post $f$, and thus acts as a check-nut for the bearing-piece $f^5$, the said sleeve $g$, however, extending up around the post $f$ above the bearing $f^5$, as shown, and being of such size as to leave a cylindrical space or chamber $f^8$ between the post $f$ and the sleeve $g$. The said post $f$ also has a longitudinal groove $f^9$, which receives within it an internal rib or projection $k^2$ (see Fig. 6) on the tubular shank $k$ of the handle-bar E$^2$, the said tubular shank $k$ fitting between the post $f$ and sleeve $g$ in the space $f^8$, before referred to, and being capable of sliding up and down with a telescopic movement in said case, while the projection $k^2$ and groove $f^9$ prevent independent rotary motion, so that when the handle-bar E$^2$ is turned it will, through the connections $k$, $g$, and $f$, turn the front wheel-fork and front wheel with relation to the main frame-work H I, extending to the rear wheel and supporting the rider and driving mechanism.

In order to fasten the handle-bar shank $k$, when adjusted to the proper height, the upper end of the sleeve $g$ is split for a short distance, as indicated at $g^2$, and is tapered or conical at its end, as indicated at $g^3$, and threaded below the said tapering portion, as indicated at $g^4$, to receive a nut $g^5$, having an internal taper corresponding to the external taper $g^3$ at the end of the sleeve $g$, so that when the nut is turned down slightly it compresses the split end of the sleeve $g$ tightly upon the post $k$, so that a rigid connection is afforded from the handle-bar to the front wheel-fork.

The brake and its actuating mechanism are best shown in Figs. 1, 5, and 6. The brake $m$ acts on the front portion of the periphery of the driving-wheel, being pivoted on a bracket $m^2$, (see Figs. 2 and 4,) connected with one of the frame-pieces $I^2$. The said brake has an arm $m^3$, (see Fig. 4,) connected by a rod $m^4$ with one end of a link $m^5$, (see Figs. 1 and 5,) pivoted to the head portion $F^2$ of the main frame. The outer end of said link $m^5$ is connected by a pair of rods $m^6$—one passing at each side of the frame-piece H—with a cross-head $m^7$, in which the lower end of a two-part telescoping rod $m^8$ is swiveled. The telescoping of said rod $m^8$ is for the purpose of providing adjustments in length corresponding to adjustments in height of the handle-bar, as the upper end of said rod is connected with actuating-levers on said handle-bar, and the swiveled connection between it and the cross-head $m^7$, or at any point between its connection with the part on the handle-bar and its connection with the link $m^5$, accommodates the swinging or steering motion of the parts connected with the handle-bar and front wheel with relation to the parts supported on the rear frame-work. It will be seen that upward movement of the connecting-piece $m^6$ $m^7$ $m^8$, as controlled by the link $m^5$, will produce a substantially longitudinal movement of the rod $m^4$ in the direction to press the brake $m$ against the wheel.

It is most convenient for the rider that the handle by which the brake is applied should be below the steering-handle and move upward in applying the brake. The said brake-handle $n$ (see Fig. 1) is thus placed below the steering-handle E and is formed at the end of a lever $n^2$, (see Fig. 6,) pivoted at $n^3$ upon the handle-bar. Thus the upward movement of the handle $n$ produces a downward movement of the opposite end of the lever, and in order to effect an upward movement of the brake-rod $m^8$ the said brake-lever $n^2$ is connected at $n^3$ with the second lever $n^4$, pivoted at $n^5$ on the handle-bar and connected at its other end with the rod $m^8$.

The connection between the levers $n^2$ and $n^3$ may be made by a pin connected with one working in a slot connected with the other, as shown, so as to accommodate the movement of the connected ends in different arcs, as is required, and by the employment of the compound lever the upward movement of the brake-handle $n$ causes the brake to be applied.

The construction of the mounting-step is best shown in Fig. 7, in which the usual stationary spindle on which the rear wheel turns is represented at $o$, being threaded as usual to receive an adjustable bearing-piece $o^2$ for one end of the rear-wheel hub. Outside the said bearing-piece the thin portion $H^4$ of the main-wheel-connecting frame fits over the spindle $o$ and acts as a washer, or is dripped between the bearing-piece $o^2$ and a nut $o^3$, that screws the outer end of the shaft $o$. Thus tightening the nut $o^3$ locks together the rear wheel and frame and also locks the bearing-piece in proper position, all in the usual manner. In the present invention, however, the said nut $o^3$ has made integral with it an axial extension $o^4$, the surface of which is roughened or knurled, so as to afford a secure hold for the foot, and thus constitute a step instead of requiring an independent part attached to the frame at or near this point, as is usual in machines of this class.

The saddle T is shown as supported upon the usual elbow-shaped piece R, adjustable vertically in its socket $H^3$ (see Fig. 1) and having the entire saddle adjustable fore and aft on its horizontal portion. The said saddle consists of a piece of leather or other flexible material supported at the front and rear ends only upon metal blocks, that of the rear end being widened to form a cantle and give the saddle the proper shape. The said metal pieces are each connected with independent springs $t^2$ $t^3$, having vertical coils, as shown, and upward extensions $t^4$ at one end of each, which are fastened to the corresponding metal pieces at the ends of the saddle, the other ends of said springs being directed vertically downward, as shown at $t^5$, to form shanks that pass through vertical sockets in the rigid longitudinal frame-plates $t^6$ $t^7$, preferably longitudinally adjustable upon one another, so as to move the springs at the forward and rear ends of the saddle bodily apart, and thus provide for proper tension of the saddle. The shank portions $t^5$ of the springs are vertically adjustable in their sockets, the springs at the front and rear being capable of independent adjustment, so that the saddle may be canted or set at any inclination fore and aft which may be preferred by the rider, and this valuable feature would be attained equally if the said springs had their sockets in a single frame-plate instead of on two plates adjustable with relation to one another. The said adjustment of the plates $t^6$ $t^7$ with relation to one another for the purpose of varying the tension of the saddle may be easily effected by means of an adjusting-bolt $t^8$, turning in a threaded lug upon the plate $t^7$, as shown, and bearing upon the plate $t^6$, and the plates are securely fastened together by means of a nut $t^9$, working in a bolt connected with the socket-piece $t^{10}$, that is fastened to the saddle-support R.

The fastening of the spring-shanks when properly adjusted may be effected by the usual set-screws, as indicated, and an additional bolt or fastening $t^{12}$ may be employed to hold the spring-supporting plates $t^6$ $t^7$ together in case it is desired to remove the saddle from the socket-piece $t^{10}$.

It should be understood that the springs at each end of the saddle are in pairs, so that their lower ends $t^5$ will pass at each side of the supporting-piece R, if required, in the fore and aft adjustment of the saddle on its supporting-piece.

I claim—

1. A bicycle comprising front steering and rear driving wheels, a fork embracing the front wheel, and frame pivotally connected therewith extending to the bearings for the rear wheel, the said frame having a downwardly-projecting portion I and two rearwardly-extending branches I² united by a connecting-piece I³, a bracket and shaft supported in bearings therein longitudinally adjustable on said branches I², and a clamp for fastening said bracket, and an adjusting-bolt for moving the said bracket along the said frame-work, substantially as and for the purpose described.

2. In a bicycle, a spring-fork comprising a rigid fork connected with bearings for the wheel, said fork having its branches united and terminating above the periphery of the wheel, a steering post or head provided with a short fork embracing the periphery of the wheel, springs connecting the forked steering-post with the fork that is connected with the wheel-bearings, and links also connecting said parts, as described, said springs and links being at the sides of the wheel near its periphery and affording a yielding connection between the steering and wheel-bearing portions of the fork and insuring a substantially parallel motion of said wheel-bearing portion as it yields, substantially as and for the purpose described.

3. The combination of the steering-post $f$, connected with the steering-wheel fork or frame and provided with a bearing-surface at its lower end and a second bearing-surface above the first and longitudinally adjustable on said post, a frame extending to the rear wheel, having bearing-surfaces co-operating with those on the steering-post, a nut for locking the adjustable bearing-piece on said post, and sleeve extending upward from said nut around the said post, a handle-bar with a shank therefor longitudinally adjustable in the space between said post and sleeve-nut, connected to rotate therewith in its different longitudinal positions, and a clamp for fastening the said shank against longitudinal movement, substantially as described.

4. A bicycle comprising front steering and rear driving wheels and a frame connecting the same, combined with a brake pivoted on said frame to co-operate with the rear wheels, rods or links connecting the same with a short lever pivoted on the handle-bar, and a second lever pivoted on the handle-bar and engaged with the first and provided with operating-handles below the steering-handle of the handle-bar, substantially as described.

5. A bicycle comprising front and rear wheels and frame-work connecting the same, an axial pin or shaft supported in said frame and itself supporting the bearings for the rear wheel, and a nut for fastening the said shaft with relation to the said frame, the said nut being provided with an integral axial extension constituting a mounting-step, substantially as and for the purpose described.

6. A bicycle-saddle comprising a leather seat, springs supporting the forward and rear ends of said seat and provided with substantially vertical shanks, and a longitudinal frame-piece in which said shanks are fastened, being vertically adjustable therein to vary the relative heights of the front and rear ends of the saddle, substantially as described.

7. A bicycle-saddle comprising a leather seat, springs supporting the forward and rear ends of said seat and provided with substantially vertical shanks, and a longitudinal frame-piece made in two parts, one longitudinally adjustable with relation to the other for the purpose of adjusting the tension of the saddle, substantially as described.

8. The combination of the steering-post $f$, connected with the steering-wheel fork or frame, and provided with a bearing-surface at its lower end and a second bearing-surface above the first and longitudinally adjustable on said post, a frame extending to the rear wheel, having bearing-surfaces co-operating with those on the steering-post, a nut for locking the adjustable bearing-piece on said post, and sleeve extending upward from said nut around the said post, a handle-bar with a shank therefor longitudinally adjustable in the space between said post and sleeve, but connected to rotate therewith in its different longitudinal positions, a washer between said bearing-piece and sleeve with a downwardly-turned flange, and a clamp for fastening the said shank against longitudinal movement, substantially as described.

In testimony whereof I have signed my name to this specification in the presence of two subscribing witnesses.

REINHARD T. TORKELSON.

Witnesses:
C. S. SHUTTUCK,
WINTHROP DELANO.